United States Patent

Lu

[11] Patent Number: 5,991,346
[45] Date of Patent: Nov. 23, 1999

[54] METHOD FOR DETERMINING THE BEST TIME TO SAMPLE AN INFORMATION SIGNAL

[75] Inventor: Keh-Shehn Lu, San Diego, Calif.

[73] Assignee: Uniden San Diego Research and Development Center, Inc., Fort Worth, Tex.

[21] Appl. No.: 08/825,779

[22] Filed: Apr. 2, 1997

[51] Int. Cl.[6] .............................. H04L 7/00; H04L 27/06; H03D 1/00
[52] U.S. Cl. .......................... 375/355; 375/342; 375/272; 375/274; 375/334; 375/336; 341/68; 341/69
[58] Field of Search .................... 375/355, 342, 375/272, 274, 334, 336; 341/68, 69

[56] References Cited

U.S. PATENT DOCUMENTS

| | | | |
|---|---|---|---|
| 5,671,256 | 9/1997 | Clark et al. | 375/342 |
| 5,706,314 | 1/1998 | Davis et al. | 375/340 |
| 5,864,590 | 1/1999 | Soubaras | 1/199 |
| 5,896,422 | 4/1999 | Lu | 375/317 |

Primary Examiner—Stephen Chin
Assistant Examiner—Michael W. Maddox
Attorney, Agent, or Firm—Hoffmann & Baron, LLP

[57] ABSTRACT

A method for determining the best time to sample data bits of a data bit stream of a received information signal in a digital communication system includes the steps of determining the current derivative of a respective sample of the information signal, weighting the sample by a predetermined amount, determining an accumulated derivative value for the same sample number of a previous symbol of the information signal, weighting the previous accumulated derivative value by another predetermined amount, summing the two weighted values together and assigning this accumulated derivative value to the respective sample. The method further includes the step of comparing the accumulated derivative values of a predetermined number of consecutive samples to determine which sample has the greatest accumulated derivative value. The sample having the greatest accumulated derivative value substantially corresponds to the beginning of a symbol. A bit determination sampling signal is generated and is timed to have a pulse or transition which occurs one-half symbol from the occurrence of the sample having the greatest accumulated derivative value.

8 Claims, 4 Drawing Sheets

METHOD FOR DETERMINING THE BEST TIME TO SAMPLE AN INFORMATION SIGNAL

BACKGROUND OF THE INVENTION

1. Field of the Invention

This invention generally relates to digital communications, and more specifically relates to the generation of synchronization and data sampling signals from transmitted digital data signals, in particular, non-return-to-zero (NRZ) signals.

2. Description of the Prior Art

Digital communications may require three or more types of synchronization, including: 1) carrier synchronization for determining carrier phase or coherence; 2) bit synchronization for determining one bit interval from another; and 3) word or frame synchronization, which is similar to bit synchronization but used for determining one group of data, i.e., a word or frame, from another.

Bit synchronization, in particular, may be derived from a separate synchronization signal, such as a pilot clock, or from the data signal itself. In currently used digital communication systems, such as GSM (Global Standard for Mobile) communications, the latter method of generating a bit sync signal is generally employed for economic and other reasons. Bit synchronization provides the proper time for sampling data in the received information signal.

A circuit for generating a sync signal directly from an NRZ data signal is illustrated in FIG. 1 of the drawing. An "eye pattern", as shown in FIG. 2, is generally used as an indication of the quality of the digital data received. The eye pattern is a continual, multi-swept display on an oscilloscope of each bit of the data stream. An eye pattern reveals timing errors and distortion in the received data stream. The more "open" the eye of the pattern is, the fewer errors and distortion of the data bit stream exist.

The preferred time for sampling each data bit of the bit stream is where the vertical opening of the eye is the greatest, for example, at time T in FIG. 2. The bit synchronizer of FIG. 1 generates a bit sync pulse signal synchronized to the input data stream and timed to coincide with the maximum eye opening. The data bit stream may then be sampled at the optimum time in correspondence with the bit sync pulse signal.

One of the problems with conventional bit synchronizers and methods for generating a bit sync pulse is an inherent timing inaccuracy in the occurrence of the bit sync pulse. Conventional bit synchronizers, such as the one shown in FIG. 1, generate the bit sync signal by sampling the eye pattern corresponding to the NRZ waveform close to its greatest peak-to-peak voltage or maximum vertical eye opening. At such sampling points, the slope of the NRZ waveform is minimal, with relatively small changes in amplitude, resulting in difficulty in discerning the optimum sampling time for the waveform (at the maximum eye opening).

OBJECTS AND SUMMARY OF THE INVENTION

It is an object of the present invention to provide a method for accurately sampling an information signal.

It is another object of the present invention to provide a method for generating a synchronization signal derived from and phased to a data bit stream.

It is a further object of the present invention to provide a method for generating a bit sync or sample signal whose timing is adjustably based on the zero crossing of selected data bits of an NRZ signal.

It is yet a further object of the present invention to provide a method for bit synchronization of a data bit stream which overcomes the inherent disadvantages of known bit synchronization techniques.

It is a further object of the present invention to provide a method for determining the best time to sample an information signal in which this determination is less affected by noise on the received signal.

It is yet another object of the present invention to provide a method for determining the best time to sample an information signal in which the determination is more accurate (i.e., less affected by noise) and the determination may be made in relatively few symbols of the information signal, especially in a noisy environment.

In accordance with one form of the present invention, a method for determining the best time to sample an information signal, and especially a non-return-to-zero (NRZ) signal, includes the step of determining the zero crossing point of the received signal waveform, as opposed to trying to determine the highest amplitude (greatest eye opening in the eye pattern) of the signal as is conventionally done. Once the zero crossing point is determined, then the time of sampling is delayed and performed one-half symbol later (from the zero crossing point). This should occur at the greatest eye opening in the pattern. A bit synchronization signal is timed to the zero crossing point, and a bit determination sampling signal is timed one-half symbol later, i.e., at the widest eye opening.

The zero crossing point is not determined, at least initially, by when the information signal crosses a threshold level. The threshold may not be accurately determined, especially initially in the process, and may be affected by offset voltages and the like. In a GMSK (Gaussian minimum shift keying) system, the Gaussian pre-filter in the modulator effectively has a memory or storage effect which affects the swing of the information signal; thus, the threshold in the demodulator must be continuously monitored and adjusted and will vary. The adjustment in the threshold may take many symbols and thus may not provide an accurate determination of the zero crossing point.

In accordance with the present invention, the zero crossing point is determined by determining which sample point of a predetermined number of sample points has the greatest slope. This is accomplished by first sampling the information signal at some predetermined rate, for example, 16 sample points/symbol. The value assigned to the information signal at each sample point (such as amplitude, or voltage, for example) is then determined.

Next, in accordance with the method of the present invention, the slope of the information signal at each sample point is determined. The slope of the information signal at the nth sample point is computed by taking the derivative of the signal waveform, such as by computing the incremental derivative derived by subtracting the value (e.g., amplitude) of the signal waveform at the n−1 sample point from the value (e.g., amplitude) of the waveform at the nth sample point. This computation yields the current derivative (of the signal) at the nth sample point.

If the signal waveform is decreasing in amplitude, the current derivative may be a negative number. If so, then the absolute value of the current derivative is used.

Next, the current derivative is weighted by a predetermined amount. For example, in the preferred method, the current derivative of the information signal at the nth sample point is weighted (i.e., multiplied) by ten percent (10%) to provide a weighted current derivative.

Then, the previous accumulated or "leak bucket" (as will be explained further) derivative value for the same sample number of the previous symbol (i.e., occurring one symbol period before the current sample point) is weighted by another predetermined amount, which is preferably ninety percent (90%). More specifically, if there are 16 samples per symbol, then to determine the slope of the nth sample, the derivative of the nth sample is determined and weighted by 10%, and the accumulated or "leak bucket" derivative for the n−16th sample (thus, of the previous symbol) is determined and weighted by another amount, for example, 90%. The two weighted derivatives are then added together to derive an accumulated or "leak bucket" derivative (i.e, slope) for the nth sample point.

The leak bucket derivatives for a predetermined number of samples (e.g., 16, if a symbol is sampled 16 times) are then compared. The time of the sample with the largest slope (i.e., "leak bucket" derivative) is selected as the zero crossing point. The bit synchronization signal is timed to this point.

Once the zero crossing point is determined using this "leak bucket" slope method, the point in time which is one-half symbol (in the example above, 8 sample points) after the zero crossing point is the time used to sample the information signal, because the widest eye opening in the eye pattern occurs at this time. The bit determination sampling signal provides a pulse (or transition) which is timed to occur in this manner.

A programmed DSP (digital signal processor), discrete circuits or an ASIC (application specific integrated circuit) may be used in accordance with the invention to carry out the process described previously.

These and other objects, features and advantages of this invention will become apparent from the following detailed description of illustrative embodiments thereof, which is to be read in connection with the accompanying drawing.

DETAILED DESCRIPTION OF THE PREFERRED EMBODIMENTS

Figure 3:
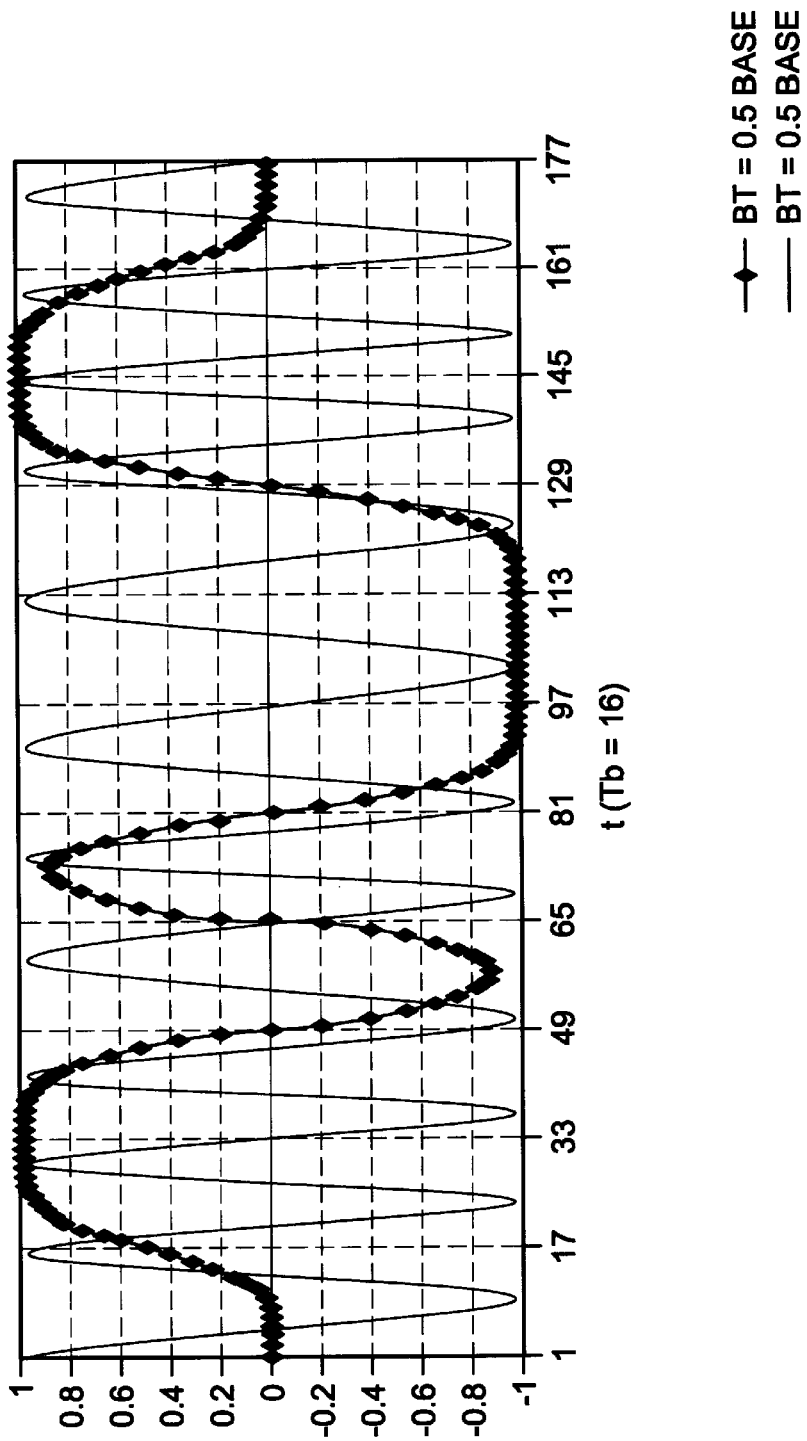
FIG. 3 is a computer generated graph of a GMSK received signal, without noise, overlaid on a carrier signal, provided for illustrating one form of a method for determining the best time for sampling an information signal (i.e., a digital data signal) in accordance with the present invention.

Referring initially to FIG. 3 of the drawing, a computer simulation of a GMSK (Gaussian minimum shift keying) received signal, without noise, is graphically illustrated and overlaid on a GMSK modulated carrier signal. The carrier frequency, $f_c$, is equal to 1/T, where T represents the bit period. The BT product for the computer simulation equals 0.5, where B represents the 3 dB bandwidth of the Gaussian pre-filter, and T, as mentioned previously, represents the bit duration.

For purposes of facilitating an understanding of the invention, the computer simulation is set up with 16 samples taken during each bit period (i.e., symbol). Each sample of the received signal is illustrated as occurring at a solid rhomboid mark superimposed on the line depicting the received signal. The x ordinate of the graph of FIG. 3 illustrates the time in sample periods so that the first bit (symbol) is shown between samples 1 through 16, the next bit is shown between 17 and 32, etc. The division between bit periods or symbols is illustrated by vertical lines in FIG. 3. The y ordinate represents a value assigned to the received signal, such as amplitude, which may be in volts. A maximum amplitude of ±1 is chosen to facilitate a description of the invention.

The received data signal illustrated by FIG. 3 is antipodal in that it extends between +1 and −1 in amplitude, and represents a typical NRZ (non-return-to-zero) signal. As can be seen from FIG. 3, the received data stream, starting at sample 17, is sequentially +1, +1, −1, +1, −1, −1, −1, +1 and +1, where +1 represents a positive excursion of the received signal corresponding to a "1" logic state, and −1 represents a negative excursion of the received signal, corresponding to a "0" logic state.

One of the purposes of the invention is to provide a method for adaptively determining the best time to sample the data bit stream of an information signal to determine the logic state of the individual data bits.

Figure 1:
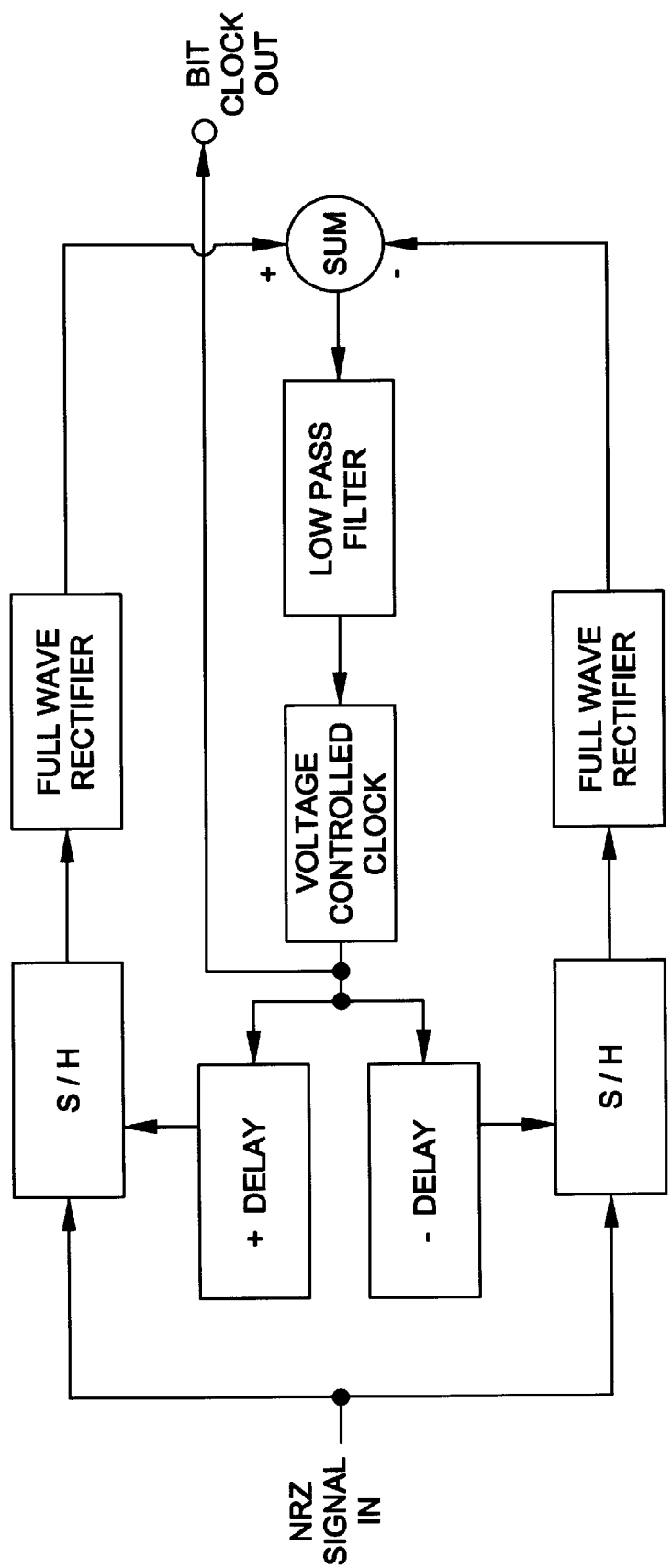
FIG. 1 is a conventional circuit for generating a synchronization signal directly from an NRZ data signal, often referred to as an early-late gate symbol synchronizer.
Figure 2:
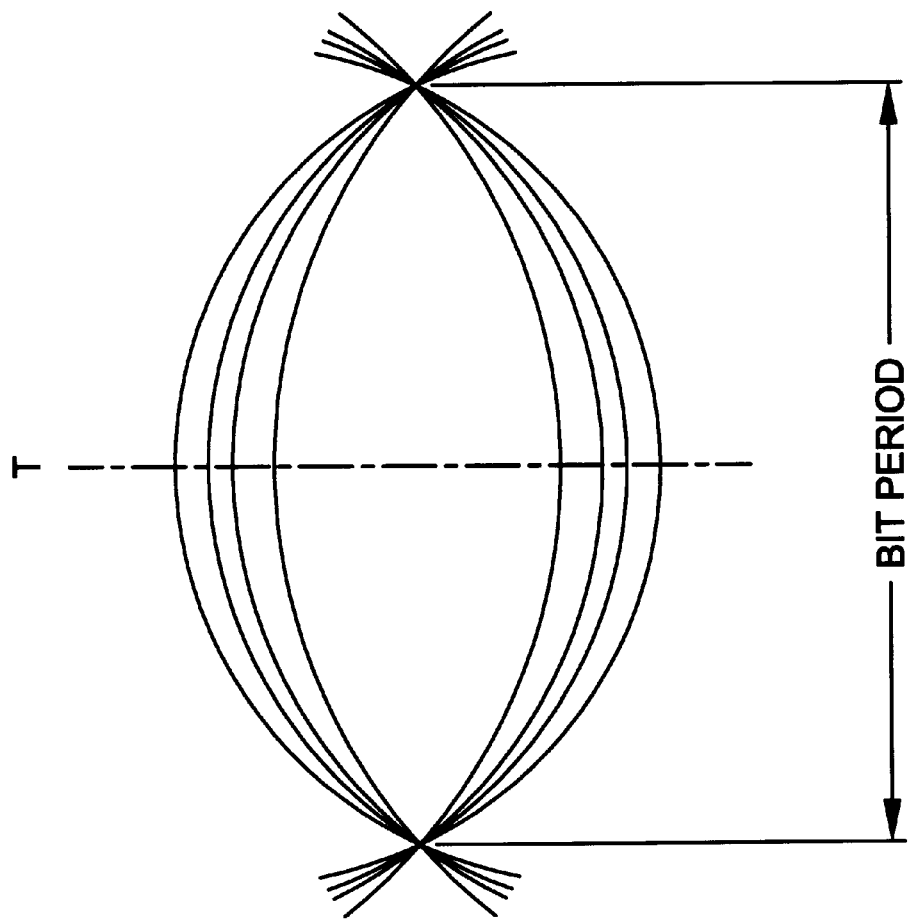
FIG. 2 is a pictorial illustration of an oscilloscope display commonly referred to as an "eye pattern".

As mentioned previously, an "eye pattern", such as illustrated by FIG. 2 of the drawing, is often studied to determine the performance of a digital communication system. The effect of intersymbol interference causes the "eye" to close, making it more difficult to sample the signal without errors, even at the preferred time occurring at the greatest width of the eye opening.

Another factor which also affects the accuracy of data determination is often found in a GMSK (Gaussian minimum shift keying) or GFSK (Gaussian frequency shift keying) communication system or any other system which employs a Gaussian pre-filter. One of the problems with a Gaussian pre-filter is that it has, effectively, a "memory" and exhibits a capacitive or inductive energy storage effect in that it affects the swing of antipodal signals, such as NRZ data signals, provided to it, at least until the energy stored in the filter has dissipated.

Depending upon the structure of the pre-filter and, of course, the width of the bit period (symbol), the energy in the filter may dissipate after two, three or more bit periods. If the energy in the pre-filter has not dissipated, the swing or excursion of the received data signal may be limited. This is illustrated in FIG. 3 of the drawing with the −1 bit followed by the +1 bit shown between samples 49 and 64 and 65 and 80, respectively. It should be noted that the negative and positive swings of the antipodal (in this case, NRZ) signal, does not reach the maximum amplitude of +1 and −1. Such limited swings are caused by this storage effect, and also noise and frequency offset between transmitter and receiver may affect the setting of a threshold voltage which is used for determining the logic state of each bit of the data bit stream. Thus, the threshold must be adjusted in accordance with the received signal. The quality of the received signal may also affect the proper timing of the symbol synchronization signal, for example, if proper timing were based solely on when the received signal crosses the threshold. With this background, a preferred form of the method of the present invention for determining the best time to sample an information signal will now be described.

In accordance with the present invention, the first step for determining the best time to sample an information signal, and especially a non-return-to-zero (NRZ) signal, is to determine the zero crossing point of the received signal waveform (as opposed to trying to determine the highest amplitude or greatest eye pattern opening of the signal as is conventionally done). Once the zero crossing point is determined, then the time of sampling is delayed and performed one-half symbol later, that is, after the zero crossing point. This should occur at the greatest eye opening in the pattern.

The zero crossing point is not, at least initially, determined by using a threshold level and when the information signal crosses the threshold, as described previously. Rather, in accordance with the present invention, the zero crossing point is determined by determining which sample point of a predetermined number of consecutive or adjacent sample points has the greatest slope. It should be understood that when "zero crossing point" is described, normally, without the effects of offset voltages or pre-filters, the zero crossing point would occur at zero amplitude in the received signal, for example at "zero" on the x-axis of FIG. 3. However, it is envisioned that the term "zero crossing point" also refers to the point in time where the signal crosses the threshold which is used in determining the logic state of the data bits of the data bit stream.

In accordance with the present invention, the zero crossing point is determined by first sampling the information signal at some predetermined rate, for example, 16 sample points/symbol. This is shown in FIG. 3 of the drawing, as described previously. The value assigned to the information signal at each sample point (such as amplitude, or voltage, for example) is then determined. This amplitude determination is preferably made on a sample-by-sample basis, in other words, as the received signal arrives, although it is envisioned to be within the scope of this invention to determine concurrently the amplitude of the information signal for a number of symbols.

The next step in the process is to determine the slope of the information signal at each sample point or at a respective sample point. More specifically, the slope of the information signal at the nth sample point is computed by taking the derivative of the signal waveform at that point. One way of computing such a derivative is by effectively computing the incremental derivative derived by subtracting the value (e.g., amplitude) of the signal waveform at the n−1 sample point from the value (e.g., amplitude or voltage, for example) of the waveform at the nth sample point. This computation yields the current derivative of the signal at the nth sample point.

For example, the 17th sample of the received signal shown in the graph of FIG. 3 has a value, or amplitude, of 0.5. The 16th sample has a value of 0.4. The incremental derivative assigned to the 17th sample would be 0.5−0.4, or 0.1. This would be the current derivative which is used in the computation to follow. A similar computation is made for each of the sample points, that is, subtracting the value of the n−1 sample from that of the nth sample.

If the signal waveform is decreasing in amplitude, as can be seen from the graph of FIG. 3, the current derivative may be a negative number. If so, then only the absolute value of this computation is used as the current derivative.

As mentioned previously, in order to find the zero crossing point of the waveform, the sample with the greatest derivative value of a predetermined number of consecutive samples is chosen as occurring at a "zero crossing" and represents a transition between adjacent symbols. For example, it can be seen from FIG. 3 that the information signal has the greatest slope (i.e., derivative) occurring during a transition in logic states, such as at sample numbers 49, 65, 81 and 129. The slopes or derivatives of the information signal at its peaks, such as at sample numbers 33, 73, 97, 113 and 145, are of low magnitude, such as approximately 0.

If just the current derivatives, which were calculated in the previous step, were used to determine the zero crossing, a problem could arise with antipodal, NRZ signals. An NRZ signal may have a consecutive number of same logic state bits, such as the three symbols shown between sample numbers 81 and 96, 97 and 112 and 113 and 128, all being −1 (representing a "0" logic state). The samples of the symbol between sample numbers 97 and 112 all would have the same current derivative, that is, zero. Accordingly, the present invention uses what the inventor refers to as a "leak bucket" approach in which the derivatives of the information signal are weighted, and weighted derivatives of previous samples are taken into account in determining the derivative value assigned to the current sample of the waveform.

More specifically, the current derivative of, for example, the nth sample is weighted by a predetermined amount. For example, in the preferred method, the current derivative of the information signal at the nth sample point is weighted (i.e., multiplied) by 10% to provide a weighted current derivative.

Then, the previous accumulated or "leak bucket" derivative value for the same sample number of the previous symbol (i.e., occurring one symbol period before the current sample) is weighted by another predetermined amount, which is preferably 90%.

For example, if there are 16 samples per symbol, then to determine the slope of the nth sample, the derivative of the nth sample is determined and weighted by 10%, and the accumulated or "leak bucket" derivative value for the n−16th sample, which thus occurs at the same relative sample number but in the previous symbol as the nth sample, is determined and weighted by another amount, for example, 90%. The two weighted derivatives are then added together to derive an accumulated or "leak bucket" derivative value (i.e., slope) for the nth sample of the information signal.

To facilitate an understanding of the invention, reference is again made to FIG. 3 of the drawing. As mentioned previously, the current derivative for the 17th sample is found incrementally, by subtracting the amplitude of the 16th sample, that is, 0.4, from the amplitude of the information signal at the 17th sample, that is, 0.5. The result is that the current derivative for the 17th sample is 0.5−0.4, or 0.1. The 0.1 value is multiplied by preferably 10% to derive a current weighted derivative of 0.01 for the 17th sample.

Since the symbol situated between sample numbers 17 and 32 (+1 in the data bit sequence) is the first data bit received, it is assumed that the accumulated or leak bucket derivative value for the 17th sample−16, or first sample point, is 0. That value, 0, is weighted by 90%, which again equals 0. The weighted previous derivative value is summed with the weighted current derivative, or 0+0.01, to derive an accumulated derivative value of 0.01 for the 17th sample.

For the 33rd sample point shown in FIG. 3, the current derivative is computed by subtracting the amplitude of the information signal at the 32nd sample point, that is, 0, from the amplitude of the information signal at the 33rd sample point, which is also 0, resulting in a current derivative of 0. Again, the current derivative for the 33rd sample is weighted by 10%, which yields 0. Sixteen samples prior to the 33rd sample is the 17th sample. The accumulated derivative value for the 17th sample, as determined previously, is 0.01. That value is weighted by 90% (i.e., multiplied by 0.09), or 0.009. This weighted value is summed with the weighted current derivative for the 33rd sample, or in other words, 0.009+0, to yield an accumulated derivative value of 0.009 for the 33rd sample.

To determine the accumulated derivative value for the 49th sample of the information signal, in accordance with the present invention, the amplitude of the information signal for the 48th sample, which is 0, is subtracted from the amplitude of the information signal for the 49th sample, which is −0.2, or another words, −0.2−0, to yield a current derivative of −0.2 for the 49th sample. The absolute value of this number is used, that is, 0.2.

Sixteen sample points previous to the 49th sample is the 33rd sample. The 33rd sample of the information signal was determined to have an accumulated derivative value of 0.009.

The current derivative value of the 49th sample is weighted by 10%, i.e., multiplied by 0.01, so that 0.2×0.01= 0.02. This number, 0.02, is the weighted current derivative value for the 49th sample.

In accordance with the method, the accumulated derivative value of the 33rd sample, that is, 0.009, is weighted by preferably 90%, in other words, multiplied by 0.09, to derive a weighted accumulated derivative value of the previous symbol's same sample number of 0.009×0.09, or 0.0081.

To determine the accumulated derivative value for the 49th sample, the weighted previous value is summed with the weighted current derivative value, or 0.0081+0.02= 0.0281. This is the accumulated derivative value for the 49th sample.

The same calculations set forth in the previous steps are made to determine the accumulated derivative value of each sample point. For example, the accumulated derivative value for the 47th sample is determined by subtracting the amplitude of the information signal at the 46th sample from that of the 47th sample to derive a current derivative value for the 47th sample, multiplying the current derivative by 10% to determine a weighted current derivative for the 47th sample, multiplying the accumulated derivative value of the 31st sample (47th sample−16 samples=31st sample) by 90% to derive a weighted accumulated derivative value from the previous symbol (i.e., the 31st sample), and summing the weighted accumulated derivative value with the weighted current derivative. This determines the accumulated derivative value assigned to the 47th sample of the information signal.

The accumulated or "leak bucket" derivative values for a predetermined number of consecutive samples are then compared to determine which one sample of that number has the greatest slope. Preferably, the predetermined number of samples used for comparison will correspond to the number of sample points in each symbol. In the example shown in FIG. 3, each symbol is sampled 16 times and, therefore, 16 derivative values are compared. The time of the sample with the greatest slope (i.e., accumulated or leak bucket derivative) is selected as the zero crossing point, indicating the beginning of the respective symbol starting with the sample having the greatest slope. This zero crossing point is used for generating the bit synchronization signal, which has a pulse or transition timed to occur at the zero crossing.

Since the zero crossing point should mark the beginning of the symbol, once the zero crossing point is determined, using this "leak bucket" slope method, the point in time which is one-half symbol (or, in the example shown in FIG. 3, eight sample points) after the zero crossing point is the time used to sample the information signal. It is at this time that widest eye opening in the eye pattern occurs. A bit determination sampling signal is generated which provides a sampling pulse or transition at this point in time (at the half symbol point) to sample each data bit of the data bit stream of the information signal.

The "leak bucket" approach of the present invention is quite suitable for use with NRZ signals. The approach allows one to "cruise" through a period of consecutive same logic state bits in the information signal, where a "flat top" having zero slope is situated, such as between sample numbers 89 and 120 in FIG. 3. Because previous accumulated derivative values are heavily weighted in the computation of the current derivative value, a virtual zero crossing, which is indicative of the beginning of each symbol, may still be determined for such "flat tops" in the signal, for example, consecutive same logic state bits (+1 or −1 symbols) in the data bit stream. Although 90% and 10% are the preferred weightings to be used in the computation of the zero crossing point, other weightings are envisioned to be used, depending on the probability of the highest expected number of consecutive same logic state bits in the data bit stream of the information signal. For example, a weighting of 90% and 10% for the previous and current derivatives, respectively, might be appropriate if a high probability of four consecutive same logic state bits are expected to be received in the data bit stream, whereas a weighting of 70% and 30% for the previous and current derivatives, respectively, might be appropriate if shorter strings, such as two or three, consecutive same logic state bits in the data bit stream are expected.

With the method of the present invention, the effect of noise will substantially be reduced. Without noise, the zero crossing point should almost always have the largest slope, which indicates the beginning of a symbol. The widest eye opening occurs one-half symbol away from the zero crossing, and this is the best time to sample the information signal.

Once a zero crossing point and, consequently, the beginning of a symbol, is determined, then the leak bucket derivative values for the next consecutive sample points occurring in time may be compared to determine the next zero crossing, either virtual or real. This procedure is repeated for each symbol of the information signal.

As stated previously, at least initially, the threshold used in determining whether the bit in the data bit stream is a logic one or a logic zero is often inaccurately set and may vary. If it is determined that the threshold has settled and is being set at the appropriate level, it may be used to check the accuracy of the zero crossing point determined by the "leak bucket" method. The sample of the symbol which is determined to have the greatest slope should be very near or within a predetermined time period tolerance of where the received information signal crosses the threshold.

The present invention provides an accurate method for sampling antipodal and NRZ signals, including those information signals transmitted and received in a GMSK or GFSK communication system. The threshold crossing determination which, in turn, allows one to determine the best time to sample the data bit stream of the information signal made by the "leak bucket" derivative method of the present invention is less affected by noise, and the method needs to operate over fewer symbols to provide an accurate indication of a beginning of a symbol, then conventional methods, especially in a noisy environment. The bit determination sampling signal which is generated in accordance with the method of the present invention is adjustably timed to provide the best sample time for sampling the data bit stream of the information signal based on the zero (i.e., threshold) crossing of the signal without having to actually rely on the accuracy of the threshold level setting.

Figure 4:
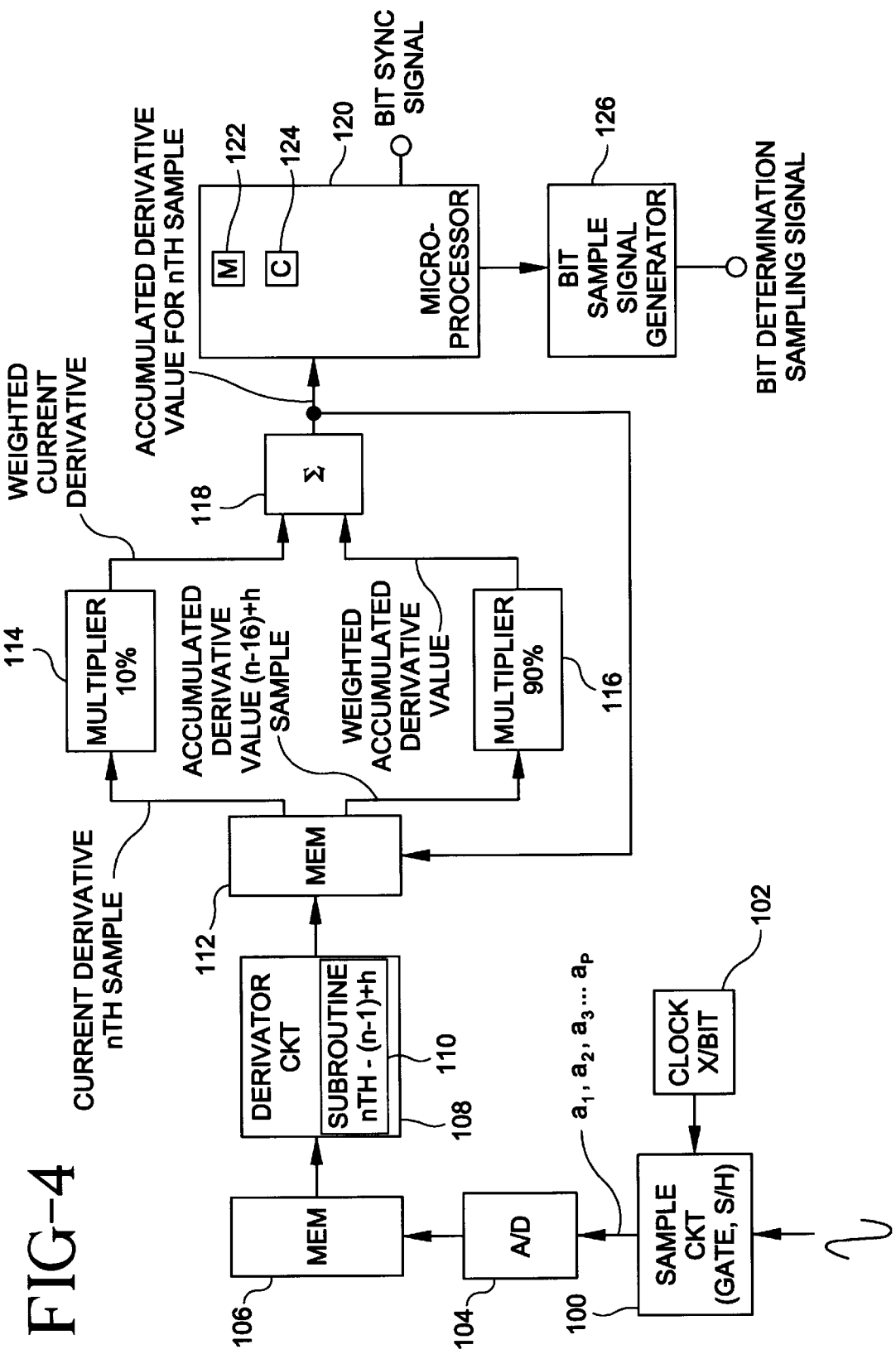
FIG. 4 is a block diagram of one form of a circuit formed in accordance with the present invention for determining the best time to sample bits in a data bit stream of an information signal received by a digital communication system and for providing a bit synchronization and/or sampling signal.

As mentioned previously, the method described above may be carried out by a programmed DSP (digital signal processor), or by an ASIC or discrete circuits. In accordance with the present invention, one form of a circuit which may be used for determining the best time to sample the information signal received by a digital communication system is shown in FIG. 4 of the drawing.

The information signal containing the data bit stream is provided to a sample circuit 100, such as a gate or a sample and hold circuit, to take samples of each bit of the data bit stream of the information signal. The sample circuit is driven by a clock 102 at a rate of X samples/bit, where X is a number greater than 2 and in accordance with the Nyquist sampling criterion. The sample circuit 100 generates an output signal which comprises a series of sequential voltages or amplitudes $a_1, a_2, a_3 \ldots a_p$, where p is an integer representing the number of samples per bit. The output signal from the sample circuit may be provided to an analog-to-digital (A/D) converter 104.

The A/D converter 104 converts the sequential analog amplitudes of the sample circuit output signal into a digital format, which is provided to a memory circuit 106, such as a register, where such digital data is stored.

The digital data representing the sampled amplitudes of the information signal, per bit of the data bit stream, is provided to a derivator circuit 108. The derivator circuit 108 includes a subtractor circuit 110, which determines the incremental derivative of each respective sample point (i.e., the nth sample) by subtracting the digitized amplitude corresponding to the n−1 sample point from the digitized amplitude of the nth sample point, and, if necessary, taking the absolute value of the result. The subtractor circuit 110 provides an output signal corresponding to the current derivative determined by the subtraction operation to a second memory 112. The second memory stores the current derivatives of each respective sample of the information signal. Memory 112 also stores the accumulated derivative value for each sample after it is determined.

Memory 112 provides an output signal corresponding to the stored current derivative for the nth sample to a first multiplier circuit 114, which weights the current derivative by a predetermined amount, such as by multiplying the current derivative by 10%, or 0.01. The first multiplier circuit 114 provides an output signal which corresponds to a weighted current derivative for the respective nth sample.

Memory 112 also provides an output signal corresponding to the stored accumulated derivative value for the n−16 sample. This output signal is provided to a second multiplier circuit 116, which weights the accumulated derivative value by a predetermined amount, that is, by multiplying the accumulated derivative value by, for example, 90%, or 0.09. The second multiplier circuit 116 provides an output signal corresponding to a weighted accumulated derivative value for the 16th sample preceding the nth sample. It should be realized that, in the example described above and shown in FIG. 4 of the drawing, it is assumed there are 16 samples of the information signal per symbol. No matter how many samples per symbol there are, it should be realized that the method of the present invention weights the derivatives of the same sample number in the current symbol and the same sample number of the previous symbol, for example, the fourth sample of the current symbol and the fourth sample of the previous symbol, so that the derivatives of sample points in a previous symbol are always taken into account when determining the accumulated derivative value for sample points in the current symbol.

The output signal of the first multiplier circuit 114, which corresponds to the weighted current derivative (i.e., for the nth sample), and the output signal of the second multiplier circuit 116, which corresponds to the weighted accumulated derivative value for the n−16 sample, are provided to a summer circuit 118 which sums the two signals together and provides an output signal which corresponds to the accumulated derivative value for the nth sample. The output signal is provided back to the second memory 112 for storage, as now the accumulated derivative value for the nth sample has been computed and will be used for the determination of the accumulated derivative value for the n+16 sample, and also to a microprocessor 120. Microprocessor 120 includes a memory 122, which receives the output signal from the summing circuit 118 and stores the accumulated derivative values for at least 16 consecutive sample points, and a comparator 124, which is coupled to the memory 122 in the microprocessor and which compares the accumulated derivative values for the 16 consecutive samples and which determines which sample has the greatest accumulated derivative value.

The microprocessor 120 generates an output signal which is provided to a bit determination sampling signal generator 126. Bit determination sampling signal generator 126 generates a bit determination sampling signal in response to the output signal from the microprocessor 120 and which includes a pulse or transition which occurs in time one-half symbol from the time of the sample having the greatest accumulated derivative value indicating the beginning of a symbol. The bit determination sampling signal is provided to a circuit in the demodulator of the communication system which samples each bit of the data bit stream of the information signal. The microprocessor 120 (or another signal generator) may also generate the bit synchronization signal, which includes a pulse or transition timed to occur at the zero crossing (i.e., at the beginning of each symbol).

Although illustrative embodiments of the present invention have been described herein with reference to the accompanied drawings, it is to be understood that the invention is not limited to those precise embodiments, and that various other changes and modifications may be effected therein by one skilled in the art without departing from the scope or spirit of the invention.

What is claimed is:

1. A method for determining the best time to sample an information signal received by a digital communication system, the information signal including a plurality of data bits situated in a data bit stream, which comprises the steps of:

a) sampling the information signal at periodic sample times at a rate of N sample times per data bit of the information signal, N being a number greater than 1;

b) determining an accumulated derivative value for the information signal at the periodic sample times; and c) comparing the accumulated derivative values for N consecutive sample times to determine the sample time of the N consecutive sample times having the largest accumulated derivative value associated therewith, the sample time with the largest accumulated derivative value substantially corresponding to the beginning of a data bit in the data bit stream of the information signal, the best time to sample the information signal occurring in time substantially one-half data bit from the sample time having the largest accumulated derivative value.

2. A method for determining the best time to sample an information signal received by a digital communication system, the information signal including a plurality of data bits situated in a data bit stream, which comprises the steps of:

a) sampling the information signal at periodic sample times at a rate of N periodic sample times per data bit of the information signal, N being a number greater than 1;

b) measuring the amplitude of the information signal at the periodic sample times;

c) determining a current derivative of the information signal at the periodic sample times;

d) determining an accumulated derivative value for the information signal at the periodic sample times; and e) comparing the accumulated derivative values for N consecutive sample times to determine the sample time of the N consecutive sample times having the largest accumulated derivative value associated therewith, the sample time with the largest accumulated derivative value substantially corresponding to the beginning of a data bit in the data bit stream of the information signal, the best time to sample the information signal occurring in time substantially one-half data bit from the sample time having the largest accumulated derivative value.

3. A method as defined by claim 2, wherein the step c) of determining the current derivative of the information signal at the periodic sample times includes the step of:

for each respective sample time, $S_T$, where T is an integer, subtracting the amplitude of the information signal measured for the sample time, $S_{T-1}$, which directly precedes the respective sample time $S_T$ from the amplitude of the information signal measured for the respective sample time $S_T$.

4. A method as defined by claim 2, wherein the step c) of determining the current derivative of the information signal at the periodic sample times includes the step of:

for each respective sample time, $S_T$, where T is an integer, subtracting the amplitude of the information signal measured for the sample time, $S_{T-1}$, which directly precedes the respective sample time $S_T$ from the amplitude of the information signal measured for the respective sample time $S_T$; and wherein the step d) of determining an accumulated derivative value of the information signal at the periodic sample times includes the steps of:

for each respective sample time $S_T$, weighting the current derivative of the information signal corresponding to the sample time $S_T$ by multiplying the current derivative for the sample time $S_T$ by a first predetermined amount to derive a weighted current derivative;

weighting a previously determined accumulated derivative value of the information signal corresponding to a sample time, $S_{T-N}$, occurring N sample times prior to the respective sample time $S_T$ by multiplying the previously determined accumulated derivative value by a second predetermined amount to derive a weighted previously determined accumulated derivative value; and adding together the weighted current derivative value and the weighted previously determined accumulated derivative value to derive an accumulated derivative value for the information signal occurring at the respective sample time $S_T$.

5. A method as defined by claim 4, wherein the first predetermined amount is about 0.01, corresponding to about 10%;

and wherein the second predetermined amount is about 0.09, corresponding to about 90%.

6. A method as defined by claim 2, which further comprises the step of:

f) determining the accuracy of the determination of the beginning of the data bit in step e), and wherein step f) includes the further steps of:

f1) sensing the time of occurrence of when the information signal crosses a data bit determination threshold;

f2) comparing the sample time of the N consecutive sample times having the largest accumulated derivative value associated therewith with the time of occurrence sensed in step f1); and f3) determining if the sample time having the largest accumulated value is within a predetermined time tolerance of the time occurrence of the threshold crossing sensed in step f1).

7. A method for generating a bit determination sampling signal used for sampling an information signal received by a digital communication system, the information signal including a plurality of data bits situated in a data bit stream, which comprises the steps of:

a) sampling the information signal at periodic sample times at a rate of N periodic sample times per data bit of the information signal, N being a number greater than 1;

b) measuring the amplitude of the information signal at the periodic sample times, and generating a first signal in response thereto and corresponding to the measured amplitudes of the information signal;

c) determining a current derivative of the information signal at the periodic sample times, and generating a current derivative signal in response thereto and corresponding to the current derivatives of the information signal;

d) determining an accumulated derivative value for the information signal at the periodic sample times, and generating an accumulated derivative value signal in response thereto and corresponding to the accumulated derivative values for the information signal;

e) comparing the accumulated derivative values of the accumulated derivative value signal for N consecutive sample times to determine the sample time of the N consecutive sample times having the largest accumulated derivative value associated therewith, the sample time with the largest accumulated derivative value substantially corresponding to the beginning of a data bit in the data bit stream of the information signal, the best time to sample the information signal occurring in time substantially one-half data bit from the sample time having the largest accumulated derivative value; and f) generating a bit determination sampling signal in response to the comparison made in step e).

8. A method for generating a bit synchronization signal for synchronizing data bits in an information signal received by a digital communication system, the information signal including a plurality of data bits situated in a data bit stream, which comprises the steps of:

a) sampling the information signal at periodic sample times at a rate of N periodic sample times per data bit of the information signal, N being a number greater than 1;

b) measuring the amplitude of the information signal at the periodic sample times, and generating a first signal in response thereto and corresponding to the measured amplitudes of the information signal;

c) determining a current derivative of the information signal at the periodic sample times, and generating a current derivative signal in response thereto and corresponding to the current derivatives of the information signal;

d) determining an accumulated derivative value for the information signal at the periodic sample times, and generating an accumulated derivative value signal in response thereto and corresponding to the accumulated derivative values for the information signal;

e) comparing the accumulated derivative values of the accumulated derivative value signal for N consecutive sample times to determine the sample time of the N consecutive sample times having the largest accumulated derivative value associated therewith, the sample time with the largest accumulated derivative value substantially corresponding to the beginning of a data bit in the data bit stream of the information signal; and f) generating a bit synchronization signal in response to the comparison made in step e).

* * * * *